(12) United States Patent
Yono et al.

(10) Patent No.: US 8,028,541 B2
(45) Date of Patent: Oct. 4, 2011

(54) METHOD OF PRODUCING BARIUM-TITANIUM-BASED OXIDE GLASS USING CONTAINERLESS SOLIDIFICATION PROCESS

(75) Inventors: Kentei Yono, Tsukuba (JP); Takehiko Ishikawa, Tsukuba (JP); Yasutomo Arai, Tsukuba (JP); Shinichi Yoda, Tsukuba (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1271 days.

(21) Appl. No.: 11/369,848

(22) Filed: Mar. 8, 2006

(65) Prior Publication Data

US 2006/0205095 A1 Sep. 14, 2006

(30) Foreign Application Priority Data

Mar. 8, 2005 (JP) ................. 2005-064055

(51) Int. Cl.
*C03B 32/00* (2006.01)
*C03B 40/04* (2006.01)

(52) U.S. Cl. ............. 65/33.2; 65/25.1; 65/33.1; 65/111; 65/137; 423/598; 423/297

(58) Field of Classification Search .................. 65/33.1, 65/33.2, 33.9, 24, 25.1; 423/598, 294.16
See application file for complete search history.

(56) References Cited

U.S. PATENT DOCUMENTS

| | | | |
|---|---|---|---|
| 3,293,051 A | 12/1966 | Searight et al. | |
| 3,493,403 A | 2/1970 | Chi Fang Tung et al. | |
| 6,153,007 A | 11/2000 | Nakata | |
| 6,967,011 B1 | 11/2005 | Saboungi et al. | |
| 2005/0024808 A1 | 2/2005 | Kawasaki et al. | |
| 2005/0199180 A1 | 9/2005 | Yono et al. | |
| 2006/0203417 A1* | 9/2006 | Kawasaki et al. | ............. 361/234 |

FOREIGN PATENT DOCUMENTS

| | | |
|---|---|---|
| JP | 42-22385 A | 11/1942 |
| JP | 48-31734 A | 10/1973 |
| JP | 08070100 | 3/1996 |
| JP | 2001-048586 A | 2/2001 |
| JP | 2001247362 A | 9/2001 |

(Continued)

OTHER PUBLICATIONS

Machine language translation of JP 2005-053726 accessed on PAJ website Jun. 12, 2009.*

(Continued)

*Primary Examiner* — Jason L. Lazorcik (74) *Attorney, Agent, or Firm* — Griffin & Szipl, P.C.

(57) ABSTRACT

Disclosed is a method of producing a barium-titanium-based ferroelectric glass using a containerless solidification process, such as an electrostatic levitation process or a gas levitation process, which comprises the steps of levitating a sample 1 of a barium-titanium-based compound by a levitating force of compressed air, heating the sample up to a temperature greater than its melting point (1330° C.) by about 100° C. to allow the sample to be molten, and, after maintaining the molten state for a given time period (at least several second), quenching the sample from a given temperature range (1400 to 1000° C.) at a cooling rate of about $10^3$ K/sec, so as to allow the sample to be solidified while inhibiting nucleation and mixing of impurities from a container. The present invention makes it possible to provide a glass exhibiting an unprecedented, extremely large permittivity.

25 Claims, 10 Drawing Sheets

FOREIGN PATENT DOCUMENTS

| | | |
|---|---|---|
| JP | 2003146697 A | 5/2003 |
| JP | 2003-284855 A | 10/2003 |
| JP | 2004-020798 A | 1/2004 |
| JP | 2005-053726 A | 3/2005 |
| WO | 2004/083757 A1 | 9/2004 |

OTHER PUBLICATIONS

Yu, J., Paradis, P.-F., Ishikawa, T., Yoda, S., Miura, I., Shan, Y-J., "Synthesis of barium titanate by electrostatic levitation", Journal of Crystal growth 273 (2005) 515-519.*

Akishige, Y., Fukano, K., Shigematsu, H., "Crystal growth and dielectric properties of new ferroelectric barium titanate: BaTi2O5" journal of Electroceramics, 13, 561-565, 2004.*

Official Action Issued in the Corresponding Japanese Application No. 2005-064055 on Oct. 29, 2007.

K. Yoshimaru et al.; Journal of the Ceramic Society of Japan, 1984, 92: p. 481.

A. Narasaki et al.; Poling-induced crystallization of tetragonal . . . ; Applied Physics Letters; American Institute of Physics; 1999; pp. 3399-pp. 3401; vol. 75; No. 21.

Kenji Haraya et al.; Gas Permeation Through the Porous Membrane Prepared From Synthetic Water-Swelling Fluoromica; 50 Yogo-Kyokai-Shil 92 [9] 1984.

Office Action issued on Dec. 11, 2006 in the corresponding Japanese patent application JP 2004-20798 (3 pages).

Paul-Francois Paradis et al., "Non-Contact Density Measurements of Liquid and Undercooled Ceramics," The 24th Japan Symposium on Thermophysical Properties, 2003, pp. 71-73.

* cited by examiner

METHOD OF PRODUCING BARIUM-TITANIUM-BASED OXIDE GLASS USING CONTAINERLESS SOLIDIFICATION PROCESS

This application claims priority from Japanese Patent Application No. 2005-064055,filed Mar. 8, 2005, the entire disclosure of which is incorporated herein by reference.

TECHNICAL FIELD

The present invention relates to a method of producing a $BaTi_2O_5$ ferroelectric glass using a containerless process.

BACKGROUND ART

Over 50 years since discovery of a ferroelectric barium titanium oxide $BaTi_2O_5$, researches on ferroelectrics with a focus on applications thereof have been carried out energetically around the world.

A ferroelectric material having a high permittivity, a piezoelectric property, a pyroelectric property, an electrooptic effect and a nonlinear optical effect is applied to various fields, such as electrical and optical fields, and used as a capacitor, an amplifying element, a piezoelectric resonant element, a pyroelectric element, a light modulator and a wavelength conversion element. In particular, recent years, great interest has been shown in researches and applications of a transparent ferroelectric oxide glass. The ferroelectric glass can be crystallized to control its optical properties, and therefore expected to be utilized as a high-performance light modulator (electrical signal/light signal conversion), optical switch (change in direction of a light path) and wavelength conversion element (change in wavelength of a laser beam). Further, the ferroelectric glass is suited to mass production at low cost in view of advantageous capability to be produced through short processes. Thus, the research and development of the ferroelectric glass are highly significant from an industrial perspective as well as scientific and engineering perspectives.

While the ferroelectric $BaTi_2O_5$ has excellent dielectric characteristics, it is extremely difficult to be formed as bulk glass due to relatively high nucleation frequency and crystal growth rate in its solidification process. In previous reports, only a thin film-shaped glass was obtained even in a roll quenching method at a cooling rate of about $10^{7\ to\ 8}$ K/s (see the following Non-Patent Publication 1). Further, an addition of a glass forming element is required to obtain a ferroelectric glass (see the following Non-Patent Publication 2).

[Patent Publication 1] Japanese Patent Application No. 2003-284855

[Patent Publication 2] Japanese Patent Application No. 2004-020798

[Non-Patent Publication 1] K. Yoshimaru, Y. Ueda, K. Morinaga, T. Yanagase, Journal of the Ceramic Society of Japan, 1984, 92: p 481

[Non-Patent Publication 2] A. Narasaki, K. Tanaka, K. Hirao, Appl. Phys. Lett. 1999; 75: p 3399

DISCLOSURE OF THE INVENTION

It is an object of the present invention to provide a method capable of producing a high-purity barium-titanium-based ferroelectric glass with high efficiency.

With a focus on barium-titanium-based compounds, the inventors have developed a high-purity barium-titanium-based ferroelectric glass production method which comprises melting a sample by a laser beam while inhibiting nucleation and mixing of impurities from a container and then quenching in a given temperature range, based on a containerless solidification process, such as an electrostatic levitation process or a gas levitation process.

Specifically, according to a first aspect of the present invention, there is provided a method of producing a barium-titanium-based ferroelectric glass, which comprises the steps of: levitating a material having a composition represented by the general formula: $Ba_x Ti_{3-x} O_{6-x}$ (wherein x=0.9 to 1.1); heating the material kept in a levitated state up to a temperature greater than its melting point by about 100° C. to allow the material to be molten; and cooling the molten material at a given cooling rate.

According to a second aspect of the present invention, there is provided a method of producing a barium-titanium-based ferroelectric glass, which comprises the steps of levitating a material having a composition represented by the general formula: $Ba_{(1-y)} M_y Ti_2 O_5$ (wherein M=Sr or Ca; y=0 to 0.5); heating the material kept in a levitated state up to a temperature greater than its melting point by about 100° C. to allow the material to be molten; and cooling the molten material at a given cooling rate.

In the above method set forth in the first or second aspect of the present invention, it is preferable that the step of heating the material includes irradiating the material with a laser beam. In this case, the material may be irradiated with the laser beam from both upper and lower sides thereof.

Preferably, the material is a spherical-shaped polycrystalline material.

The given cooling rate is preferably about 500 K/sec or more, more preferably, about 800 K/sec or more, particularly preferably about 1000 K/sec or more.

The heating temperature of the material is preferably in the range of about 1200 to 1500° C., more preferably, in the range of about 1300 to 1400° C.

Preferably, the method set forth in the first or second aspect of the present invention further includes the step of, prior to the start of the step of cooling the molten material, maintaining the melting temperature for a given time period. In this case, the given time period is preferably at least several seconds.

According to a third aspect of the present invention, there is provided an apparatus for melting and solidifying a material while keeping the material in a levitated state, which comprises: a gas levitation furnace having a nozzle for injecting gas upward to levitate the material; a fixed base disposed below the gas levitation furnace to support the gas levitation furnace; a gas supply device for supplying the gas to the gas levitation furnace through the fixed base; a laser device for irradiating the material with a laser beam serving as a heating source for heating the material; a flow regulator device for regulating a flow volume of the gas; a temperature measurement device for measuring a temperature of the material; and a control device for controlling the laser beam irradiation based on a temperature of the material measured by the temperature measurement device, so as to control the temperature of the material. The gas to be introduced in the gas levitation furnace may include air, Ar, $O_2$ and $N_2$.

Preferably, the apparatus set forth in the third aspect of the present invention is provided with a beam splitting device for splitting a laser beam from the laser device into at least two split beams, and designed to irradiate the material with the split beams, respectively, from upper and lower sides of the material.

Preferably, the temperature measurement device is a radiation thermometer oriented toward the material. Preferably, the apparatus set forth in the third aspect of the present invention further includes a camera device for monitoring the levitated state of the material, and the flow regulator device is designed to regulate a flow volume of the gas to the gas levitation furnace based on the levitated state of the material shot by the camera device.

According to the present invention, a barium-titanium-based ferroelectric glass can be produced with high efficiency while effectively preventing crystallization and crystal growth during solidification. The obtained barium-titanium-based ferroelectric glass is suitable for use in a light modulator, an optical switch and a wavelength conversion element, and can be widely used in electrical and optical fields. Further, in transition temperatures from a glass phase to a crystal phase, the material exhibits an extremely large relative permittivity of 10,000,000 or more. The material having such an extremely large permittivity can be used, for example, as a material of a high-temperature, large-capacity, small-size electronic device.

BEST MODE FOR CARRYING OUT THE INVENTION

With reference to the drawings, an embodiment of the present invention will now be described.

[Gas Levitation Furnace & Control Device]

Figure 1:
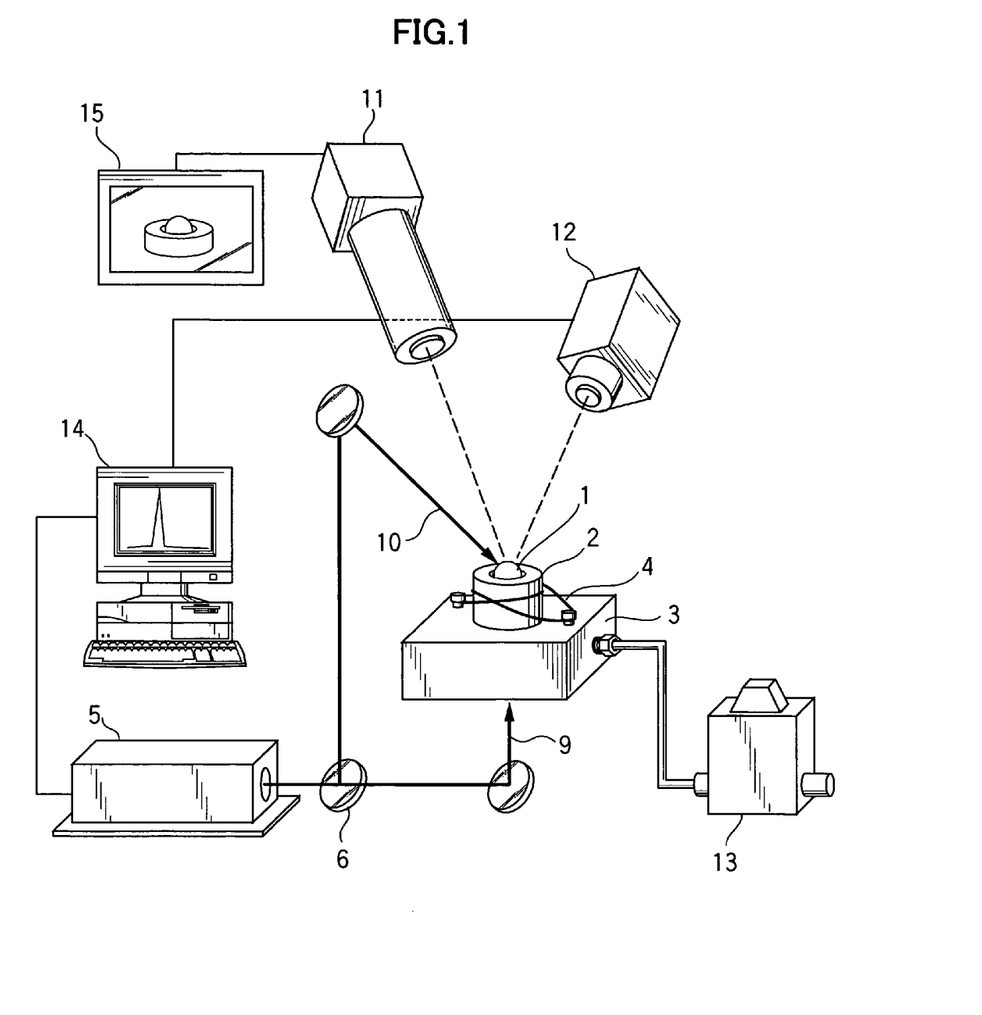
FIG. 1 is an overall block diagram showing a gas levitation apparatus.

Referring to FIG. 1, in a gas levitation apparatus according to this embodiment, a gas levitation furnace 2 is used for levitating a sample 1. As shown in FIG. 1, a fixed base 3 is provided as a means to supply levitating gas to the gas levitation furnace 2 therethrough and prevent movement of the gas levitation furnace 2, and the gas levitation furnace 2 is fixedly mounted on the fixed base 3 using an anchoring wire 4. The sample 1 is placed in a vertically-extending through-hole of the gas levitation furnace 2, and the gas is injected upward from a nozzle disposed below the through-hole of the gas levitation furnace 2 in such a manner to levitate the sample 1. A flow regulator device 13 is provided as a means to control a flow volume of the gas so as to allow the sample 1 to be levitated. A levitated state of the sample 1 is monitored by an image pickup device. In this embodiment, a CCD camera 11 is used as the image pickup device. The CCD camera 11 is electrically connected to a monitor 15 to visually check a position of the sample 1. The flow regulator device 13 may be designed to regulate the flow volume of the gas based on an output of the CCD camera 11. A radiation thermometer 12 is disposed oriented toward the sample 1 to measure a temperature of the sample 1 in a non-contact manner. The temperature of the sample 1 measured by the radiation thermometer 12 is acquired by a computer 14. In this embodiment, a carbon dioxide gas laser device 5 is provided as a means to generate a laser beam for heating the sample 1. The computer 14 is electrically connected to the carbon dioxide gas laser device 5 to control a power or intensity of the laser beam. Specifically, the computer 14 is operable, in response to receiving temperature data about the sample 1 detected by the radiation thermometer 12, to control the power of the laser beam serving as a heating source of the sample 1 so as to control the temperature of the sample 1. The laser beam from the carbon dioxide gas laser device 5 is split by a beam splitter 6 into two split beams each having an even power. Then, the sample 1 kept in the levitated state is irradiated with the split beams incident, respectively, from lower and upper sides of the sample 1 through two reflectors 9, 10, and heated up to a given temperature. The above apparatus illustrated in FIG. 1 is designed to heat the sample 1 up to a temperature of about 1300 to 1400° C. so as to allow the sample 1 to be molten, and then cool the molten material at a cooling rate of about 500 to 1500 K/sec so as to solidify the material to form a glass.

[Gas Levitation/Solidification Process]

In the apparatus illustrated in FIG. 1, the gas (e.g. air, Ar, $O_2$ or $N_2$) is introduced into the gas levitation furnace 2 at a flow volume of about 0.7 liter/minute. The two laser beams are emitted, respectively, from above and below the sample 1 to heat the sample 1. A temperature of the sample 1 is measured from above the sample 1 by the radiation thermometer 12. In a process of levitating the sample 1, the gas is injected in such a manner as to blow out of the gas levitation furnace 2 to levitate the sample 1. Then, the sample 1 kept in the levitated state is heated and molten by the laser beams incident thereon from above and below. The levitated state is continuously monitored by the CCD camera 11, and a video image can also be recorded according to need. Further, the state of the sample 1 is visually checked using the monitor 15, and an operator can appropriately adjust the flow regulator device to regulate the flow volume of the gas in such a manner as to prevent the sample 1 from being wrongly vibrated or brought into contact with the gas levitation furnace 2. In this embodiment, the radiation thermometer 12 for measuring a temperature of the sample 1 is disposed at approximately the same height as and at a different angle from those of the CCD camera 11. The radiation thermometer 12 is operable to analyze emission of light from the sample 1 and measure a temperature of the sample 1 based on the emission. The detected temperature is sent to the computer 14, and used for controlling the temperature of the sample 1 through adjustment of the laser beam power. The molten material is cooled at a given cooling rate, and solidified without occurrence of crystallization to form a glass of a barium-titanium-based material.

EXAMPLE 1

Figure 2A:
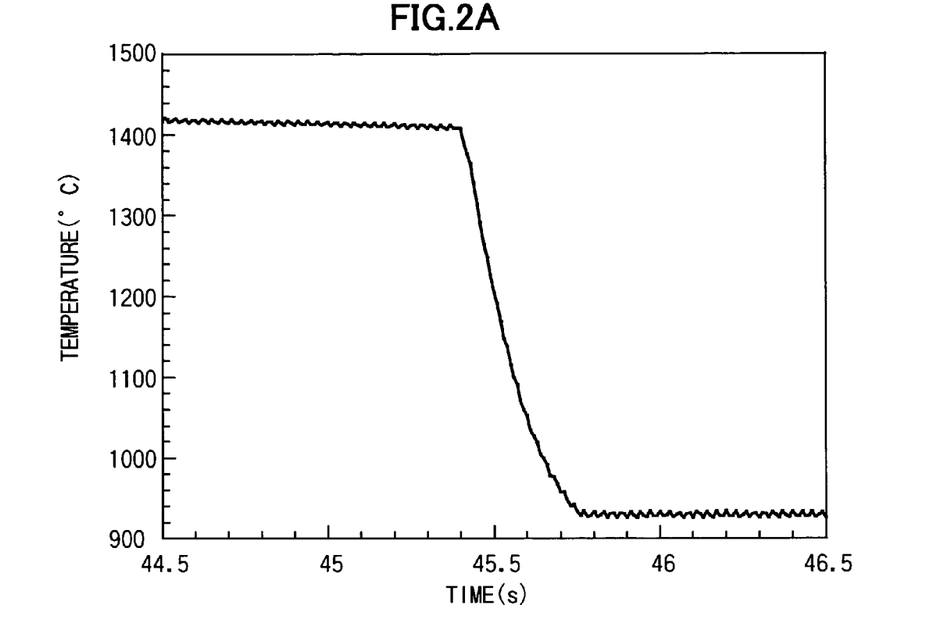
FIG. 2 is a graph showing a cooling curve in a production method for a $BaTi_2O_5$ glass.
Figure 2B:
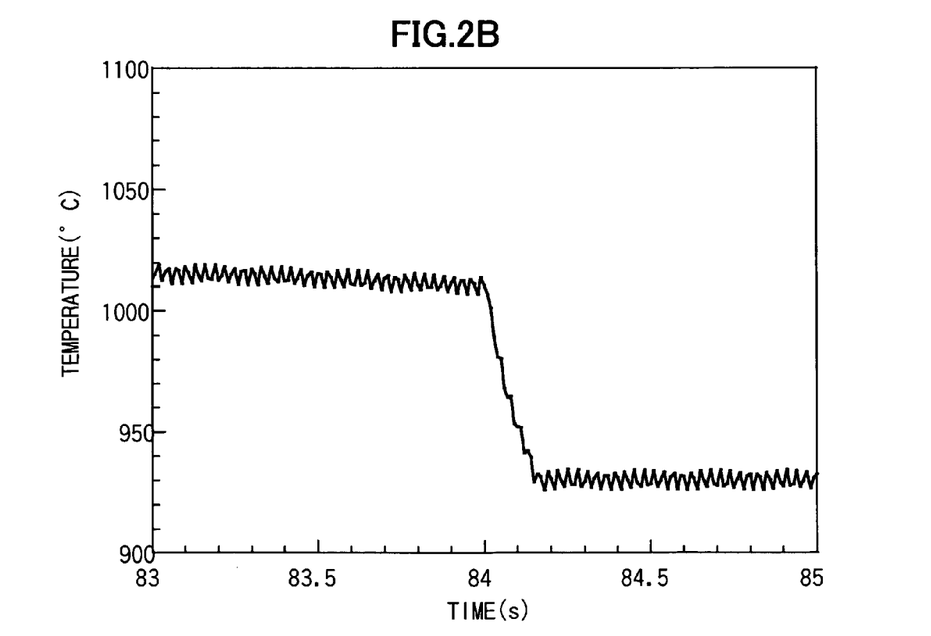
Figure 3:
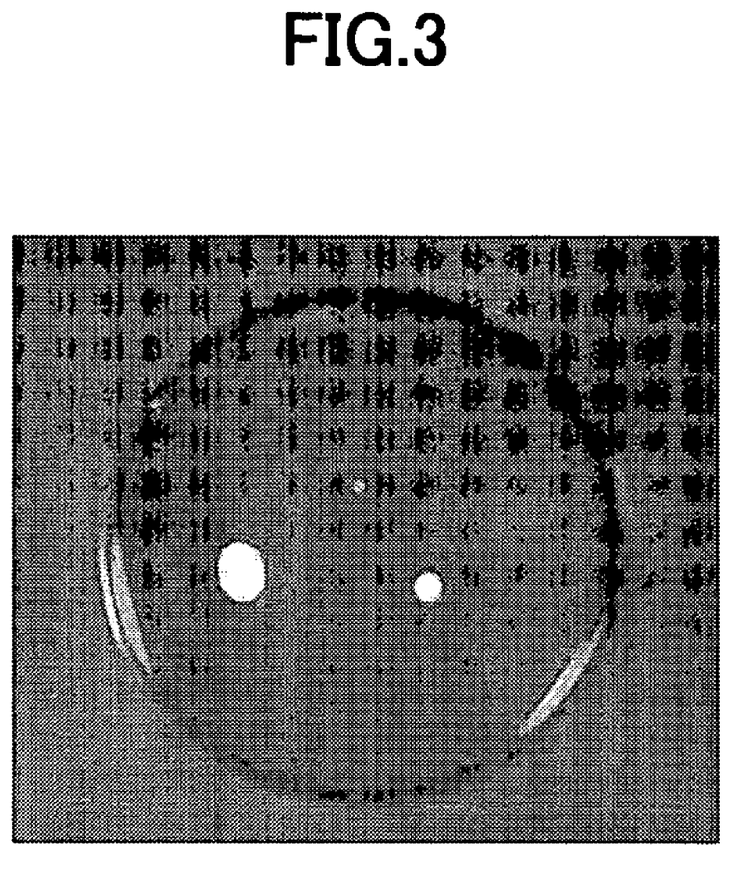
FIG. 3 is an optical-microscopic photograph showing the $BaTi_2O_5$ glass.

A sample 1 was prepared using about 20 mg of spherical-shaped polycrystalline material having a composition of $BaTi_2O_5$, and molten and solidified using the gas levitation apparatus illustrated in FIG. 1. Specifically, the sample 1 was levitated based on a levitating force of compressed air used as levitating gas. In the levitated state, the sample 1 was heated up to a temperature greater than a melting point (1330° C.) of the sample 1 by about 100° C., through means of laser beam irradiation, and molten. After being held in the molten state for a given time period (at least several seconds), the sample 1 was rapidly cooled or quenched from a given temperature (1400 to 1000° C.) at a cooling rate of about $10^3$ K/sec, and solidified. FIG. 2(a) shows a cooling curve for quenching the sample 1 from 1400° C., and FIG. 2(b) shows a cooling curve for quenching the sample 1 from 1000° C. An exothermic peak to be caused by crystallization during solidification is not observed in both the cooling curves. If crystallization occurs during the course of continuously cooling and solidifying the sample 1, a peak caused by exothermic heat will appear on the cooling curve. The above cooling curves having no exothermic peak prove that no crystallization occurs during solidification. In other words, it is verified that the sample 1 is solidified in a non-crystallized state or in a glass state. FIG. 3 is an optical-microscopic photograph showing the obtained spherical-shaped transparent sample.

Figure 4:
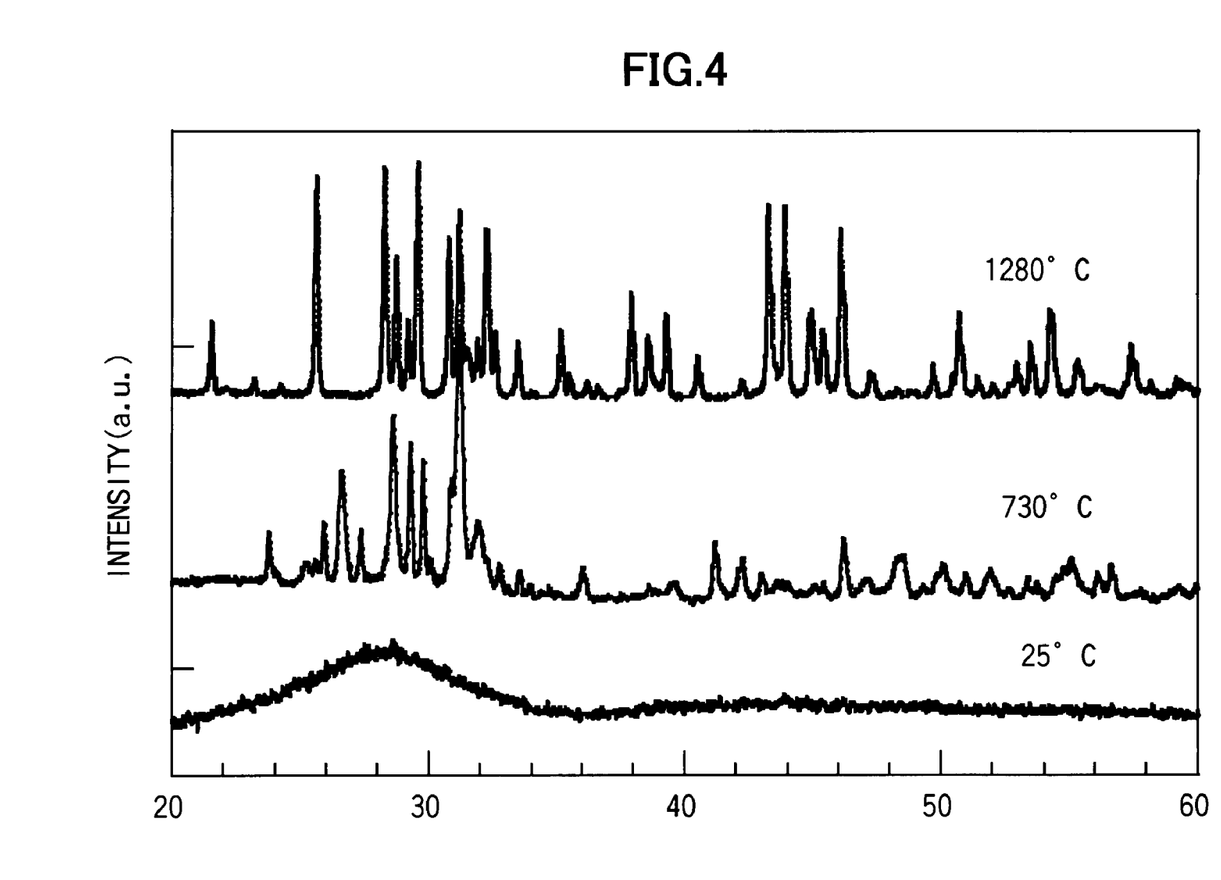
FIG. 4 is a graph showing X-ray diffraction patterns of $BaTi_2O_5$ glasses, respectively, in a room temperature environment and after being heated up to a given temperature.

FIG. 4 shows three X-ray diffraction patterns of the $BaTi_2O_5$ transparent samples, respectively, in a state when being placed in a room temperature environment, in a state after being heated up to 730° C. and in a state after being heated up to 1280° C. The X-ray diffraction pattern in the room temperature environment exhibits only a wide range of gentle peak peculiar to a glassy or vitreous material, without any steep or sharp peak. If a crystal structure resides in the transparent sample, a sharp peak caused by a crystal lattice will be observed. Thus, as seen in FIG. 4, the transparent sample placed in the room temperature environment is a glass. Each of the X-ray diffraction patterns of the $BaTi_2O_5$ transparent samples in a state after being heated up to 730° C. and 1280° C. exhibits a sharp peak peculiar to a crystal material. This proves that when the transparent sample is heated up to 700° C. or more, a glass phase is transformed to a crystal phase.

Figure 5:
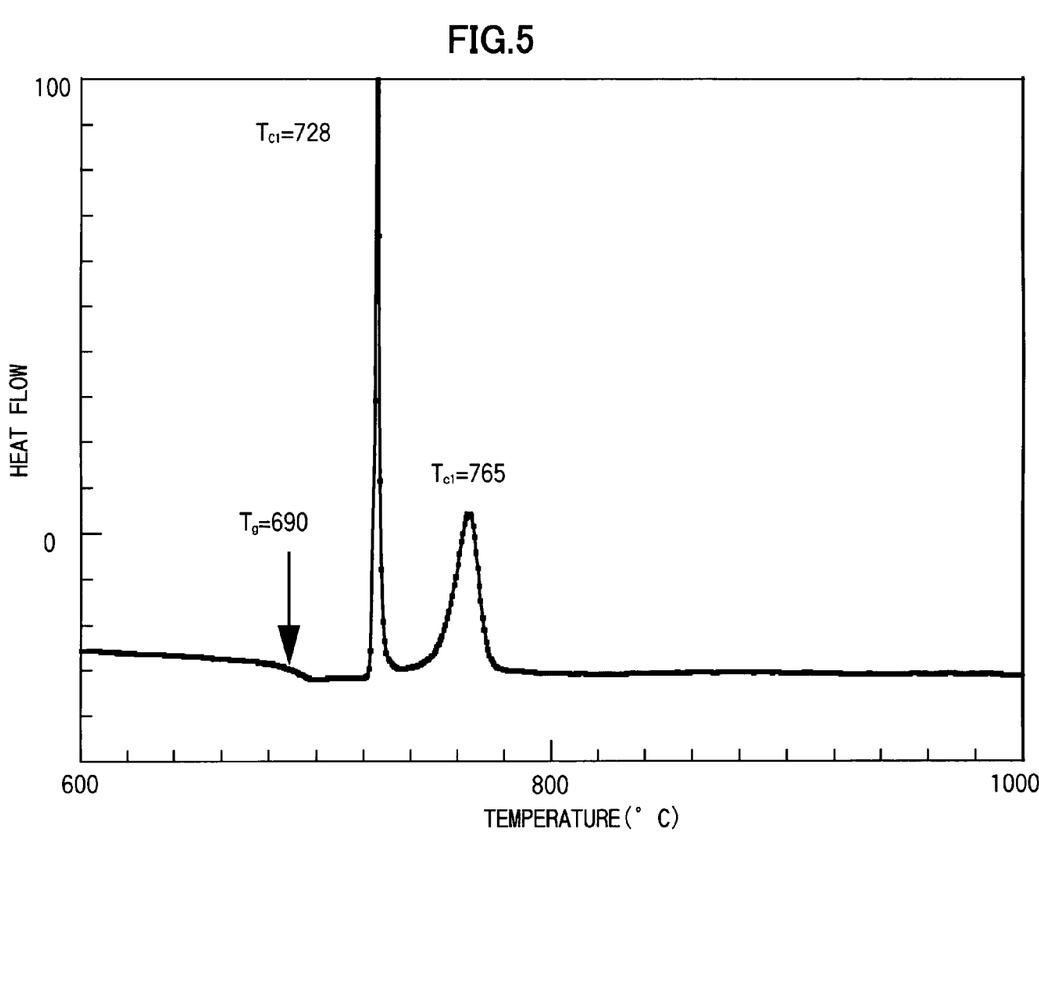
FIG. 5 is a graph showing the result of differential scanning calorimetric (DSC) analysis of the $BaTi_2O_5$ glass.

FIG. 5 shows differential scanning calorimetric (DSC) analysis data about the $BaTi_2O_5$ transparent sample. As seen in this data, the transparent sample has three phase transition temperatures (690° C., 728° C. and 765° C.). Specifically, the result in FIG. 5 shows that a glass transition occurs at about 690° C., and then the transition from the glass phase to the crystal phase occurs at two temperatures of 728° C. and 765° C.

Figure 6:
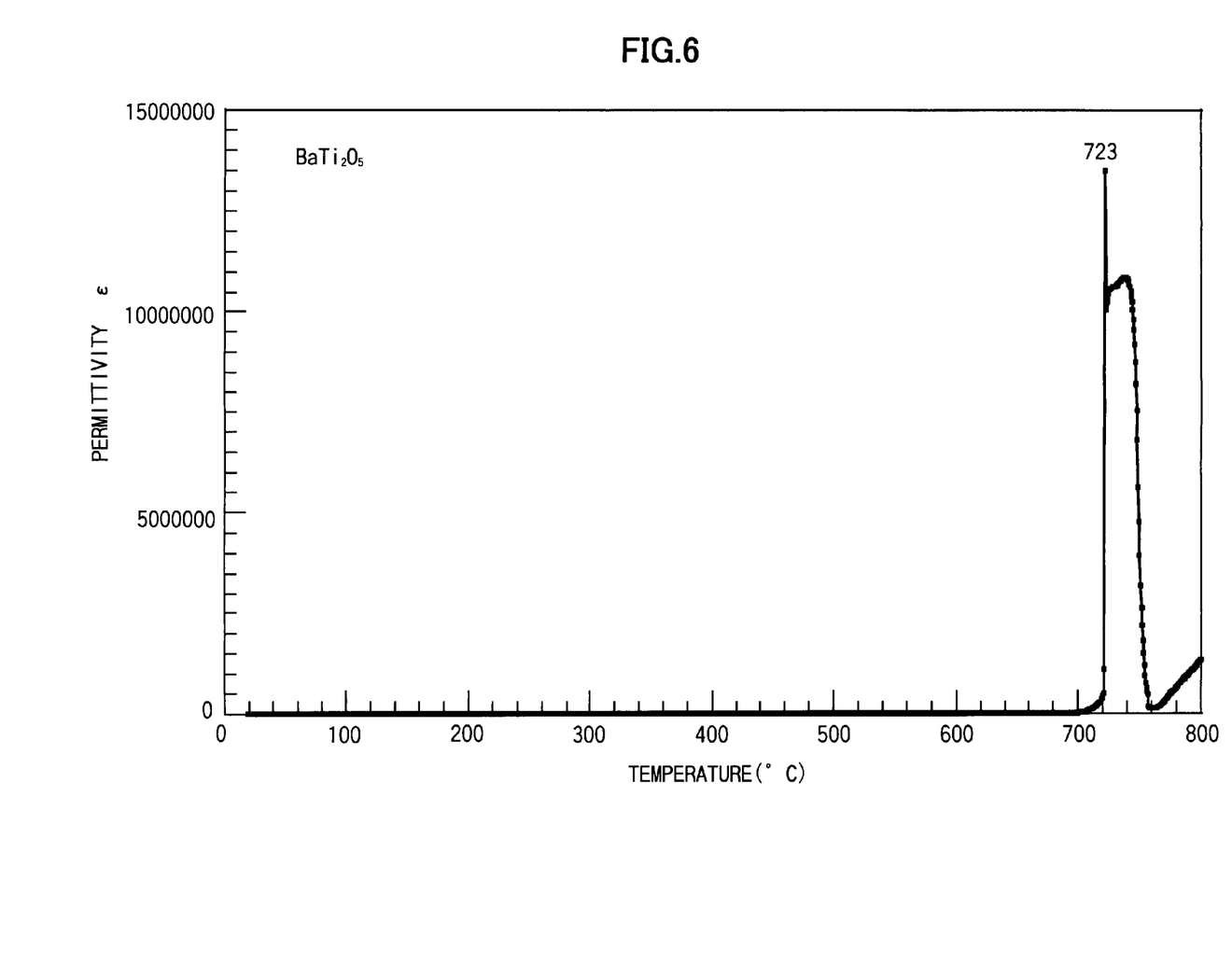
FIG. 6 is a graph showing a measurement result of permittivity of the $BaTi_2O_5$ glass.

FIG. 6 shows a measurement result of permittivity of the $BaTi_2O_5$ transparent sample. As seen in FIG. 6, the formed glass has an extremely large relative permittivity of about 10,000,000 or more at a temperature (723° C.) close to the crystallization temperature.

EXAMPLE 2

Plural types of samples were prepared by varying ratios of Ba and Ti in a composition represented by the general formula: $Ba_x Ti_{3-x} O_{6-x}$ (wherein x=0.92 to 1.13). A glass was formed using each of the samples, and properties of the formed glass were measured.

Specifically, in the same manner as that in Example 1, each of the samples was prepared using about 20 mg of spherical-shaped polycrystalline material having the composition represented by the general formula: $Ba_x Ti_{3-x} O_{6-x}$ (wherein x=0.92 to 1.13). Then, by use of the gas levitation apparatus illustrated in FIG. 1, the sample was levitated, and heated up to a given temperature using the laser device 5. After the sample was molten, it was held in the molten state for a given time period. Then, the sample was cooled in the same cooling curve as that in Example, and solidified. More specifically, each of the samples was levitated based on a levitating force of compressed air used as levitating gas. In the levitated state, the sample was heated up to a temperature greater than its melting point by about 100° C., through means of laser beam irradiation. After being held in the molten state for a given time period, the sample was quenched from a given temperature (1400 to 1000° C.) at a cooling rate of about $10^3$ K/sec. An exothermic peak to be caused by crystallization during solidification was not observed in all cooling curves of the samples. Through X-ray diffraction analysis, it was verified that each of the obtained spherical-shaped transparent glasses is a glass.

Figure 7:
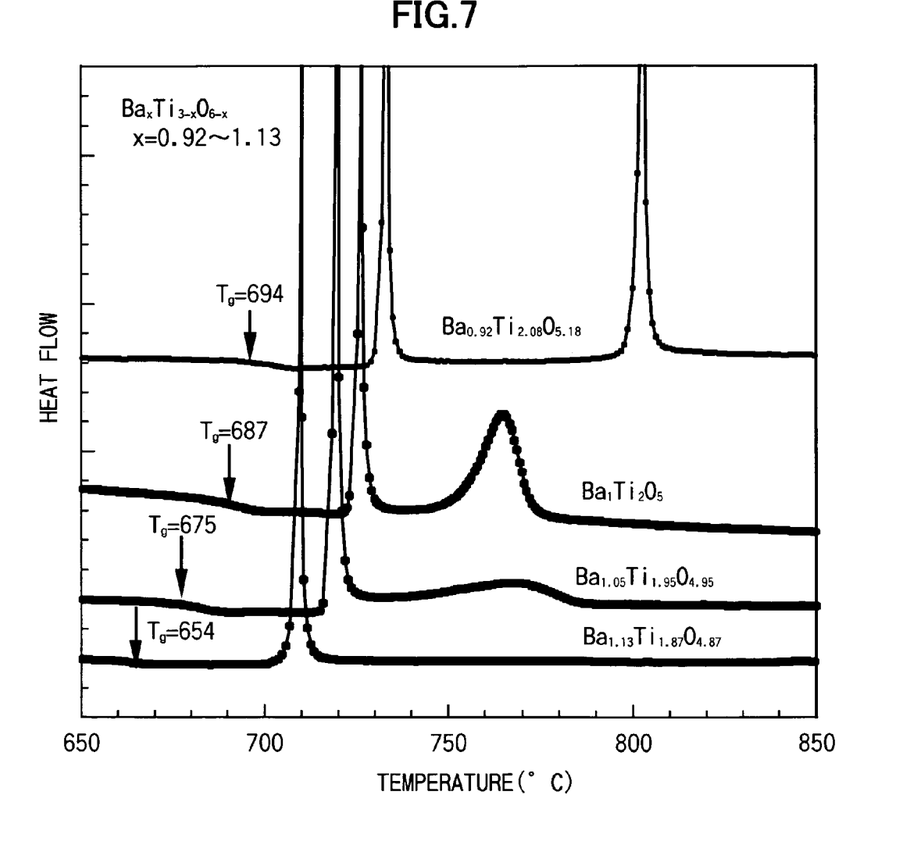
FIG. 7 is a graph showing the result of differential scanning calorimetric (DSC) analysis of a glass having a composition represented by the general formula: $Ba_x Ti_{3-x} O_{6-x}$ (wherein x=0.92 to 1.13).

FIG. 7 shows the result of differential scanning calorimetric analysis of the four transparent samples having the composition represented by the general formula: $Ba_x Ti_{3-x} O_{6-x}$ (wherein x=0.92, 1.0, 1.05 and 1.13). As seen in FIG. 7, a glass transition temperature and a crystallization temperature exist in each of the transparent samples. This means that each of the four transparent samples is kept in a vitreous state at a room temperature.

Figure 8:
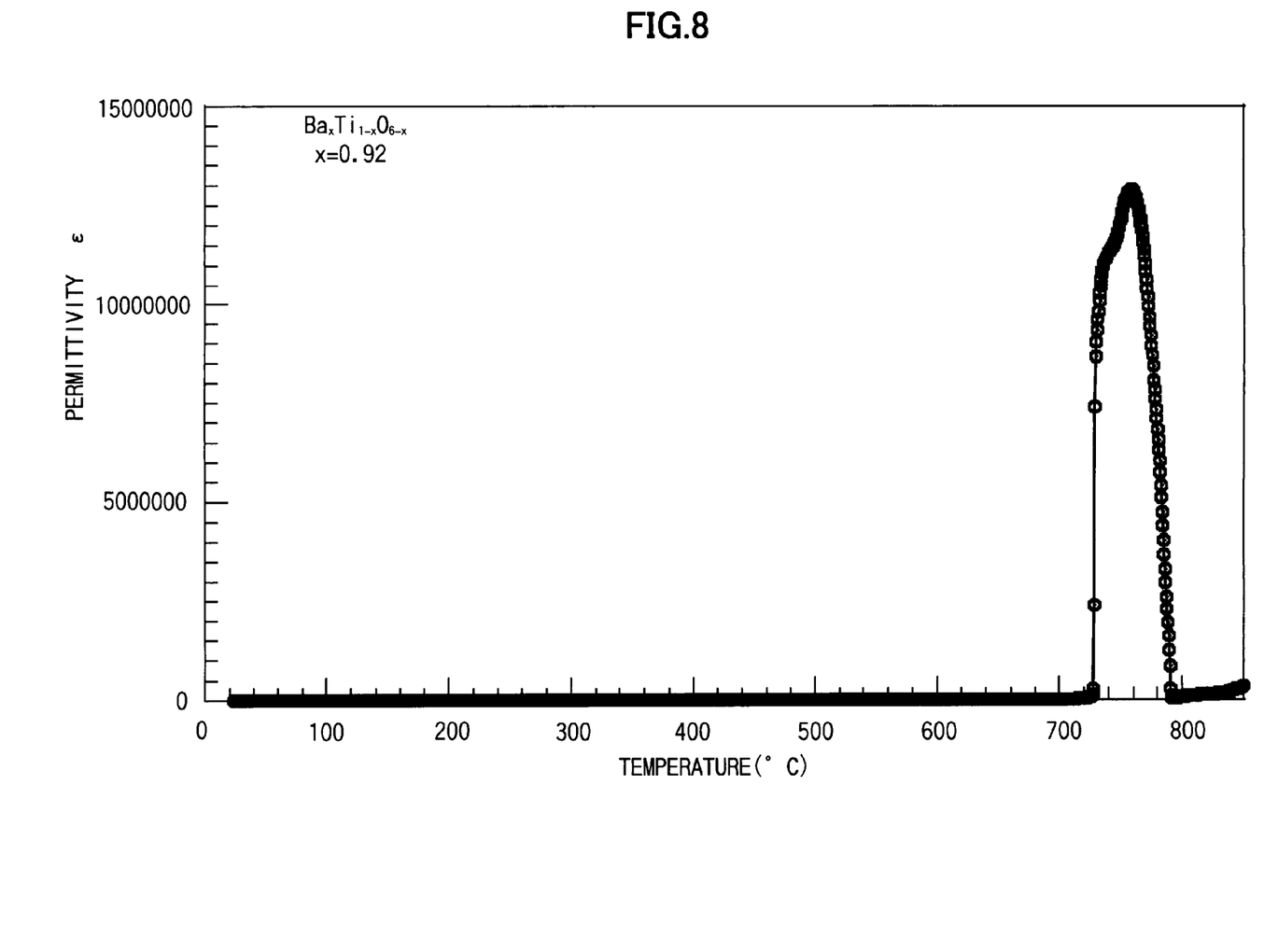
FIG. 8 is a graph showing a measurement result of permittivity of the glass having the composition represented by the general formula: $Ba_x Ti_{3-x} O_{6-x}$ (wherein x=0.92).

FIG. 8 shows a measurement result of permittivity of the transparent sample having the composition represented by the general formula: $Ba_x Ti_{3-x} O_{6-x}$ (wherein x=0.92). As seen in FIG. 8, the transparent sample has an extremely large relative permittivity of about 10,000,000 or more at a temperature (730° C.) close to the crystallization temperature, as with the $BaTi_2O_5$ transparent sample in Example 1.

EXAMPLE 3

In the same manner as that in Example 1, each of plural types of samples was prepared using about 20 mg of spherical-shaped polycrystalline material having the composition represented by the general formula: $Ba_{(1-y)} M_y Ti_2 O_5$ (wherein M=Sr or Ca; y=0.05 to 0.15), and molten and solidified using the gas levitation apparatus illustrated in FIG. 1. Specifically, each of the samples was levitated based on a levitating force of compressed air used as levitating gas. In the levitated state, the sample was heated up to a temperature greater than its melting point by about 100° C., through means of laser beam irradiation. After being held in the molten state for a given time period, the sample was quenched from a given temperature (1400 to 1000° C.) at a cooling rate of about 10 K/sec. An exothermic peak to be caused by crystallization during solidification was not observed in all cooling curves of the samples. Through X-ray diffraction analysis, it was verified that each of the obtained spherical-shaped transparent glasses is a glass.

Figure 9:
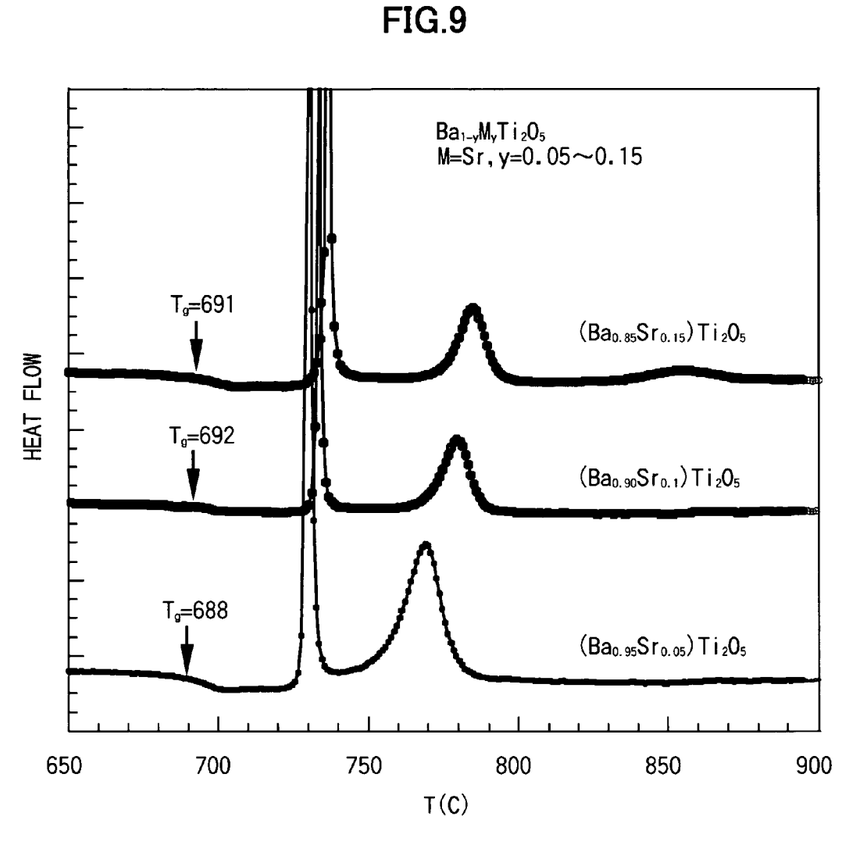
FIG. 9 is a graph showing the result of differential scanning calorimetric (DSC) analysis of a glass having a composition represented by the general formula: $Ba_{(1-y)} M_y Ti_2 O_5$ (wherein M=Sr; y=0.05 to 0.15).

FIG. 9 shows the result of differential scanning calorimetric analysis of the three transparent samples having the composition represented by the general formula: $Ba_{(1-y)} M_y Ti_2 O_5$ (wherein M=Sr; y=0.05, 0.1, 0.15). As seen in FIG. 9, a glass transition temperature and a crystallization temperature exist in each of the transparent samples.

Figure 10:
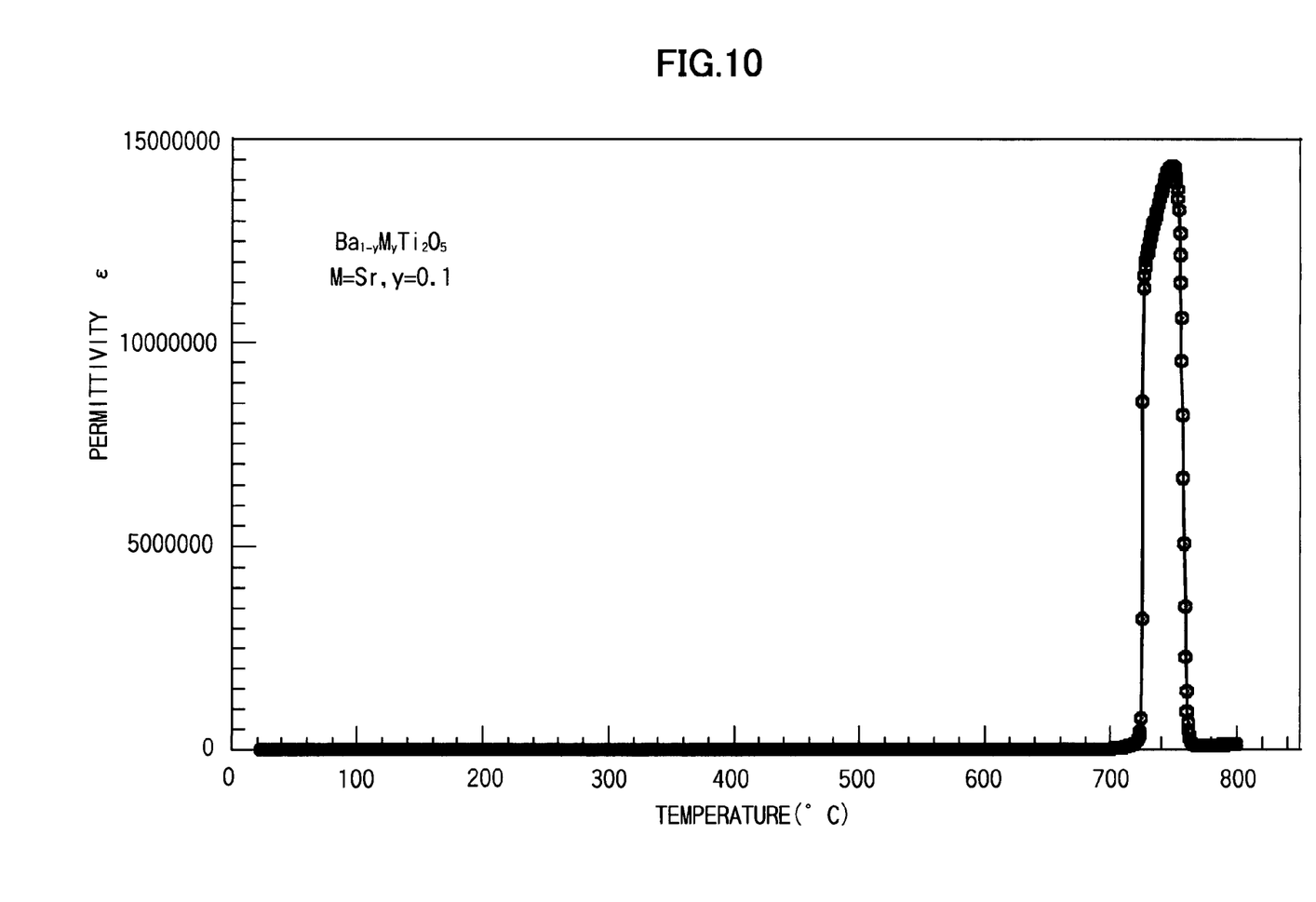
FIG. 10 is a graph showing a measurement result of permittivity of the glass having the composition represented by the general formula: $Ba_{(1-y)} M_y Ti_2 O_5$ (wherein M=Sr; y=0.1).

FIG. 10 shows a measurement result of permittivity of the transparent sample having the composition represented by the general formula: $Ba_{(1-y)} M_y Ti_2 O_5$ (wherein M=Sr; y=0.1). As seen in FIG. 10, the transparent sample has an extremely large relative permittivity of about 10,000,000 or more at a temperature (730° C.) close to the crystallization temperature, as with the $BaTi_2O_5$ transparent sample in Example 1.

INDUSTRIAL APPLICABILITY

It has been proven that the method of the present invention can provide a glass exhibiting an extremely large permittivity which could not be achieved by conventional methods. This glass having unprecedented features is expected to be applied, for example, to optical devices (optical switches and optical sensors).

What is claimed is:

1. A method of producing a barium-titanium-based ferroelectric glass, comprising the steps of:
    gas levitating a material by using a regulated gas flow to keep the material in a gas levitated state, wherein the material has a composition represented by the general formula: $Ba_x Ti_{3-x} O_{6-x}$, wherein x=0.9 to 1.1;
    heating said material, while kept in the gas levitated state, up to a temperature greater than the melting point of said material by about 100° C. to allow said material to be molten; and
    cooling said molten material at a cooling rate of about 500 K/sec or more.

2. The method as defined in claim 1, wherein the step of heating the material includes irradiating said material with a laser beam.

3. The method as defined in claim 2, wherein said material is irradiated with said laser beam from both upper and lower sides thereof.

4. The method as defined in claim 1, wherein said material is a spherical-shaped polycrystalline material.

5. The method as defined in claim 1, wherein said cooling rate is about 800 K/sec or more.

6. The method as defined in claim 5, wherein said cooling rate is about 1000 K/sec or more.

7. The method as defined in claim 6, wherein the heating temperature of said material is in the range of about 1200 to 1500° C.

8. The method as defined in claim 7, wherein the heating temperature of said material is in the range of about 1300 to 1400° C.

9. The method as defined in claim 1, which further includes the step of prior to the start of the step of cooling said molten material, maintaining said melting temperature for a given time period.

10. The method as defined in claim 9, wherein said given time period is at least several seconds.

11. The method as defined in claim 1, wherein said molten material cooling at the cooling rate of about 500 K/sec or more forms barium-titanium-based ferroelectric glass.

12. The method as defined in claim 11, wherein the barium-titanium-based ferroelectric glass has a large relative permittivity of about 10,000,000 or more at a temperature close to the crystallization temperature of said molten material.

13. The method as defined in claim 1, further comprising the steps of:
    monitoring a position of said material; and
    regulating the regulated gas flow based on output obtained by monitoring the position of said material.

14. A method of producing a barium-titanium-based ferroelectric glass, comprising the steps of:
    gas levitating a material by using a regulated gas flow to keep the material in a gas levitated state, wherein the material has a composition represented by the general formula: $Ba_{(1-y)} M_y Ti_2 O_5$, wherein M=Sr or Ca; y=0 to 0.5;
    heating said material, while kept in the gas levitated state, up to a temperature greater than the melting point of said material by about 100° C. to allow said material to be molten; and
    cooling said molten material at a cooling rate of about 500 K/sec or more.

15. The method as defined in claim 14, wherein the step of heating the material includes irradiating said material with a laser beam.

16. The method as defined in claim 14, wherein said material is a spherical-shaped polycrystalline material.

17. The method as defined in claim 16, wherein said material is irradiated with said laser beam from both upper and lower sides thereof.

18. The method as defined in claim 14, wherein said cooling rate is about 1000 K/sec or more.

19. The method as defined in claim 14, wherein the heating temperature of said material is about 1200° C. or more.

20. The method as defined in claim 19, wherein the heating temperature of said material is in the range of about 1300 to 1400° C.

21. The method as defined in claim 14, which further includes the step of prior to the start of the step of cooling said molten material, maintaining said melting temperature for a given time period.

22. The method as defined in claim 21, wherein said given time period is at least several seconds.

23. The method as defined in claim 14, wherein said molten material cooling at the cooling rate of about 500 K/sec or more forms barium-titanium-based ferroelectric glass.

24. The method as defined in claim 23, wherein the barium-titanium-based ferroelectric glass has a large relative permittivity of about 10,000,000 or more at a temperature close to the crystallization temperature of said molten material.

25. The method as defined in claim 14, further comprising the steps of:
    monitoring a position of said material; and
    regulating the regulated gas flow based on output obtained by monitoring the position of said material.

* * * * *